(12) United States Patent
Klobucar

(10) Patent No.: US 6,294,000 B1
(45) Date of Patent: Sep. 25, 2001

(54) ROTARY CONCENTRATOR AND METHOD OF PROCESSING ADSORBABLE POLLUTANTS

(75) Inventor: Joseph M. Klobucar, Detroit, MI (US)

(73) Assignee: Durr Environmental, Inc., Wixom, MI (US)

( * ) Notice: Subject to any disclaimer, the term of this patent is extended or adjusted under 35 U.S.C. 154(b) by 0 days.

(21) Appl. No.: 09/406,181

(22) Filed: Sep. 24, 1999

(51) Int. Cl.⁷ .................................................. B01D 53/06
(52) U.S. Cl. ............................... 95/113; 95/115; 95/143; 96/123; 96/125; 96/128; 96/130; 96/143; 96/150
(58) Field of Search ............................... 95/99, 114, 115, 95/143, 113; 96/123–128, 130, 143, 146, 150

(56) References Cited

U.S. PATENT DOCUMENTS

| | | | |
|---|---|---|---|
| 4,012,206 | * 3/1977 | Macriss et al. | 96/125 X |
| 4,529,420 | * 7/1985 | Norbäck | 96/123 |
| 4,701,189 | * 10/1987 | Oliker | 96/127 X |
| 4,729,774 | * 3/1988 | Cohen et al. | 96/123 |
| 4,846,855 | * 7/1989 | Tsujimoto | 96/123 X |
| 5,512,083 | * 4/1996 | Dunne | 95/115 X |
| 5,526,651 | * 6/1996 | Worek et al. | 96/143 X |
| 5,584,916 | * 12/1996 | Yamashita et al. | 96/123 |
| 5,647,891 | * 7/1997 | Blizzard et al. | 95/99 |
| 5,667,560 | * 9/1997 | Dunne | 95/115 X |
| 5,688,305 | * 11/1997 | Graeff | 96/150 X |
| 5,695,546 | * 12/1997 | Izumi et al. | 95/115 |
| 5,702,505 | * 12/1997 | Izumi et al. | 95/115 |
| 5,788,744 | 8/1998 | Klobucar et al. | 95/113 |
| 5,891,219 | 4/1999 | Klobucar et al. | 95/113 |
| 5,958,109 | * 9/1999 | Fuderer | 95/98 |
| 6,080,227 | * 6/2000 | Kurosawa et al. | 96/150 X |

* cited by examiner

*Primary Examiner*—Robert H. Spitzer
(74) *Attorney, Agent, or Firm*—Howard & Howard

(57) ABSTRACT

A rotary concentrator heats media in a desorption zone to a desorption temperature, then removes the pollutants using a second cold desorbent gas stream in a desorbent zone. First, the adsorbent media is rotated and an inlet gas stream is passed over the media in the adsorbent zone, thereby removing the adsorbable pollutants. A first gas stream having a temperature equal to or greater than the desorption temperature of the adsorbable pollutants is passed over the media in the desorbent zone to heat the media to generally the desorption temperature of the adsorbable pollutants. A second gas having a temperature less than the desorption temperature of the adsorbent media is passed over the media in the desorbent zone to remove the adsorbable pollutants from the desorbent zone. Subsequently, the gas containing the adsorbable pollutants received from the desorbent zone is processed by destroying or removing the adsorbable pollutants.

23 Claims, 4 Drawing Sheets

ROTARY CONCENTRATOR AND METHOD OF PROCESSING ADSORBABLE POLLUTANTS

FIELD OF THE INVENTION

This invention relates to improvements in rotary concentrators and methods of removing adsorbable pollutants from an inlet gas stream using a rotary concentrator having a dual temperature desorbent zone which improves the efficiency and operation of the system.

BACKGROUND OF THE INVENTION

The removal and treatment of pollutants in industrial gas streams has resulted in the development of many types of pollution control devices. One commonly used device is a rotary concentrator. A rotary concentrator is basically a rotating unit enclosed within a housing. The rotating unit includes adsorption media, such as activated carbon or zeolite depending on the pollutant to be removed from the inlet gas stream. There are various types of rotary concentrators, including concentrators wherein the adsorbent media is disk-shaped or in the form of an annulus and concentrators which utilize blocks of media arranged, for example, around a central axis to form an annulus. Generally, the media has a porous ceramic base or substrate with the appropriate adsorbent media deposited on the base. However, the rotating unit and media can take various forms including layered disks, etc. as would be known to a person of ordinary skill in this art.

In a conventional rotary concentrator, the adsorbent media is divided by ducting and seals into an adsorbent section or zone and a smaller desorbent zone. Inlet process gas, which contains an adsorbable pollutant, is passed over the adsorbent media in the adsorption zone, which removes the adsorbable pollutants. Clean gas then leaves the rotary concentrator. Heated desorption gas is simultaneously passed over the adsorbent media in the desorbent zone, thereby removing the pollutants, which can be destroyed or oxidized in a thermal or catalytic oxidizer for example. Thus, as the media rotates within the housing, the process air is cleaned of adsorbable pollutants and the adsorbable pollutants are removed from the media in the desorption zone.

The temperature of the gas necessary for desorption will depend upon the media and the adsorbable pollutants. In a typical application, the desorption gas is heated to a temperature of between about 250° to 350° F. which effectively removes the adsorbed pollutants in the desorption zone. Generally, clean gas is heated to the desorption temperature of the media and the gas is then circulated to an oxidizer processor. The construction and operation of conventional rotary concentrators are well known in this art and therefore no detailed description of such concentrators is required for the understanding of the improved rotary concentrator and method of this invention.

Fig. 1 illustrates schematically a conventional rotary concentrator. As set forth above, a conventional rotary concentrator includes adsorbent media 20 which is rotated within a sealed housing (not shown). The housing includes ducting and seals which direct the process inlet gas stream to predetermined sections of the adsorbent media as now described. As set forth above, the adsorbent media 20 can take various forms, including a disk-shaped, an annular shaped, blocks, etc. However, the shape and configuration of the housing and the form of the adsorbent media is well known in this art and does not form a part of this invention.

The adsorbent media is divided by the housing and seals into an adsorbent zone 22 and a much smaller desorbent zone 24. Contaminated gas containing an adsorbable pollutant is directed over the adsorbent media in the adsorbent zone 22 as shown in FIG. 1 at 26. Where the adsorbent media 20 is disk-shaped as shown, annual or blocks of media, the media is normally applied to a substrate having numerous holes and interticies. The gas then flows through the interticies in the substrate over the adsorbent media. The adsorbable pollutants are then adsorbed by the media, such that the gas leaving the adsorbent zone 22 has been purified by removal of the adsorbable pollutants as shown at 28. The adsorbed pollutants must then be removed from the adsorbent media, which is accomplished in the desorbent zone 24.

As the adsorbent media 20 rotates as shown by arrow 30, a typical segment 32 will rotate into the desorbent zone 24. As will be understood, this segment now contains adsorbable pollutants which must be removed from the adsorbent media. The absorbed pollutants are then removed in the desorbent zone 24 by hot desorbent gas, such as air heated to the desorption temperature. The desorption temperature will depend upon the pollutant which has been absorbed by the media and the media used. In a typical application, the desorption temperature is between about 250° to 350° F. The hot desorption gas 34 enters the desorption zone 24 and is passed over the adsorbent media, removing the pollutants from the media. The desorption gas is then directed to a control device (not shown) through a desorption gas outlet 36 which removes or destroys the pollutant, typically a thermal oxidizer, such as a regenerative thermal oxidizer or a catalytic oxidizer. The oxidizer processor typically vents the hot clean air to the atmosphere. Rotary concentrators also may include an optional cooling zone 38 shown in broken lines to cool the adsorbent media prior to returning the media for use for absorption. That is, the cooling zone 38 is not a desorbent zone because the pollutants have already been removed from the desorbent zone 24 prior to movement of the adsorbent media into the cooling zone 38. As will be understood, the media is more adsorbent at cooler temperatures. The clean coolant gas is directed from the inlet 40, over the media in the cooling zone 38, to the outlet 42.

FIG. 2 is a graph of the temperature of air exiting a segment of media as it passes through the desorbent zone 24 and the pollutant concentration as the media rotates through the desorbent zone. The adsorbent media is initially at the adsorbent temperature, which is generally between ambient and about 100° F. The media is then heated to the desorption temperature by the hot desorption gas as shown at 34 in FIG. 1. Typically, the desorption temperature is between 250° to 350° F. in a conventional rotary concentrator. Thus, the media is heated to the desorption temperature and as it approaches the desorption temperature, the concentration of the adsorbable pollutants peak and fall off in a bell-shaped curve. As will be understood from FIG. 4, the media 20 in the desorption zone 24, however, remains essentially at the desorption temperature until cooled either in the cooling zone 38 or by the inlet polluted gas stream. Thus, FIG. 2 illustrates the temperature and concentration of pollutants exiting from a typical segment 32 as it moves through the desorption zone 24. It has been believed, however, that it is necessary to maintain the desorption temperature of the media in the desorption zone 24 until all of the pollutants are removed by the heated desorption gas.

Reference is also made to U.S. Pat. No. 5,788,744 assigned to the assignee of the present application. This patent discloses an improved rotary concentrator, wherein the gas received from the desorption zone is divided into two outlet sections. The first section which is located upstream of the desorption zone is relatively free of pollutant gas and recirculated either to the desorption or adsorption inlet. The balance of the desorption exhaust gas has a lower volume, higher pollution concentration and a higher temperature, all of which lead to more cost effective final control. However, the split desorption outlet system disclosed in this patent requires the same volume of heated desorption gas as a conventional rotary concentrator system. The energy and equipment required to provide this volume of heated gas limited the capital and operating cost advantages of the split desorption outlet system as compared to a conventional rotary concentrator system.

The improved rotary concentrator system and method of this invention utilizes a dual temperature and preferably a dual desorption zone that significantly reduces the volume of heated adsorption gas required. The rotary concentrator and method of this invention is thus more efficient and cost effective.

SUMMARY OF THE INVENTION

The method of removing adsorbable pollutants from an inlet gas stream using a rotary concentrator of this invention heats the media in the desorption zone to the desorption temperature, then removes the pollutants using a second cold desorbent gas stream. This method is most effectively carried out using two adjacent desorbent zones. However, it is possible to use a single desorbent zone, wherein the adsorbent media is indexed in two stages through the desorbent zone. As set forth above, it has been believed that the media in the desorbent zone must be maintained at the desorption temperature during removal of all of the pollutants. However, laboratory testing has indicated that the method of this invention using dual temperatures is not detrimental to the thoroughness of the desorption.

More specifically, the method of this invention includes rotating the adsorbent media, passing the inlet gas stream including the adsorbable pollutants over the absorption zone, thereby removing the pollutants. The method then includes passing a first gas stream having a temperature equal to or greater than the desorption temperature of the pollutants on the media over the desorbent zone for a time sufficient to heat the desorbent zone to the desorption temperature of the adsorbable pollutants. The method then includes passing a second desorbent gas having a temperature less than the desorption temperature of the media over the desorbent zone to remove most or substantially all of the pollutants from the desorbent zone. The gas containing the adsorbable pollutants received from the desorbent zone is then directed to a processor, destroying or removing the adsorbable pollutants.

In the most preferred embodiment of the rotary concentrator of this invention, the concentrator includes two adjacent desorbent zones, wherein the first desorbent zone is located upstream of the second desorbent zone as the adsorbent media rotates through the zones. The method then includes passing a first gas having a temperature equal to or greater than the desorption temperature over the media in the first desorbent zone to heat the media and passing the second gas having a temperature less than the adsorption temperature over the adsorbent media in the second desorbent zone to remove the pollutants. In actual operation, only a very small percentage of the pollutants are removed in the first desorbent zone and most of the adsorbable pollutants are removed in the second desorbent zone. Thus, the cold desorbent gas thus not only removes most of the pollutants from the media, but also cools the media for efficient operation of the media in the absorption zone. As will be understood, this method thus significantly reduces the volume of heated desorption gas required, thus improving the efficiency of the system. The media in the desorbent zone is heated to the same temperature as a conventional rotary concentrator, but the temperature is not maintained for as long, thereby improving the energy efficiency of the system. The exhaust gas from the first desorbent zone is relatively cool and relatively pollutant free and can thus be recirculated back to the second desorbent zone or the inlet gas stream. The exhaust from the second desorbent zone is directed to an oxidizer processor to destroy the pollutants.

The rotary concentrator of this invention thus includes a rotating unit having adsorbent media including an adsorbent zone, a first desorbent zone and an adjacent second desorbent zone, wherein the first desorbent zone is located upstream of the second desorbent zone as the adsorbent media rotates. A processed gas inlet directs the inlet gas stream having removable adsorbable pollutants over the media in the adsorption zone. A hot desorbent gas inlet directs hot desorbent gas having a temperature equal to or greater than the desorption temperature over the media in the first desorbent zone thereby heating the media to the desorption temperature. A second cold desorbent inlet directs desorbent gas having a temperature less than the desorption temperature over the media in the second desorbent zone thereby removing the pollutants and cooling the media. The exhaust from the second desorbent zone is then directed directly or indirectly to an oxidizer processor.

The rotary concentrator and method of this invention thus provides more efficient removal and destruction of adsorbable pollutants in a relatively simple method and construction. Other advantages and meritorious features of this invention will be more fully understood from the following description of the preferred embodiments, the appended claims and the drawings, a brief description of which follows.

DESCRIPTION OF THE PREFERRED EMBODIMENTS OF THIS INVENTION

Figure 1:
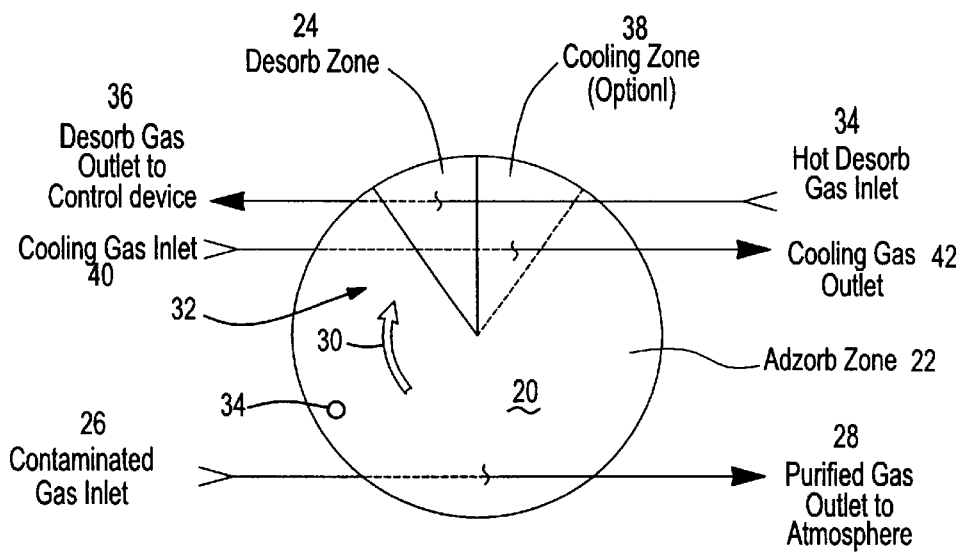
FIG. 1 is a schematic drawing of a conventional rotary concentrator including an optional cooling zone.
Figure 2:
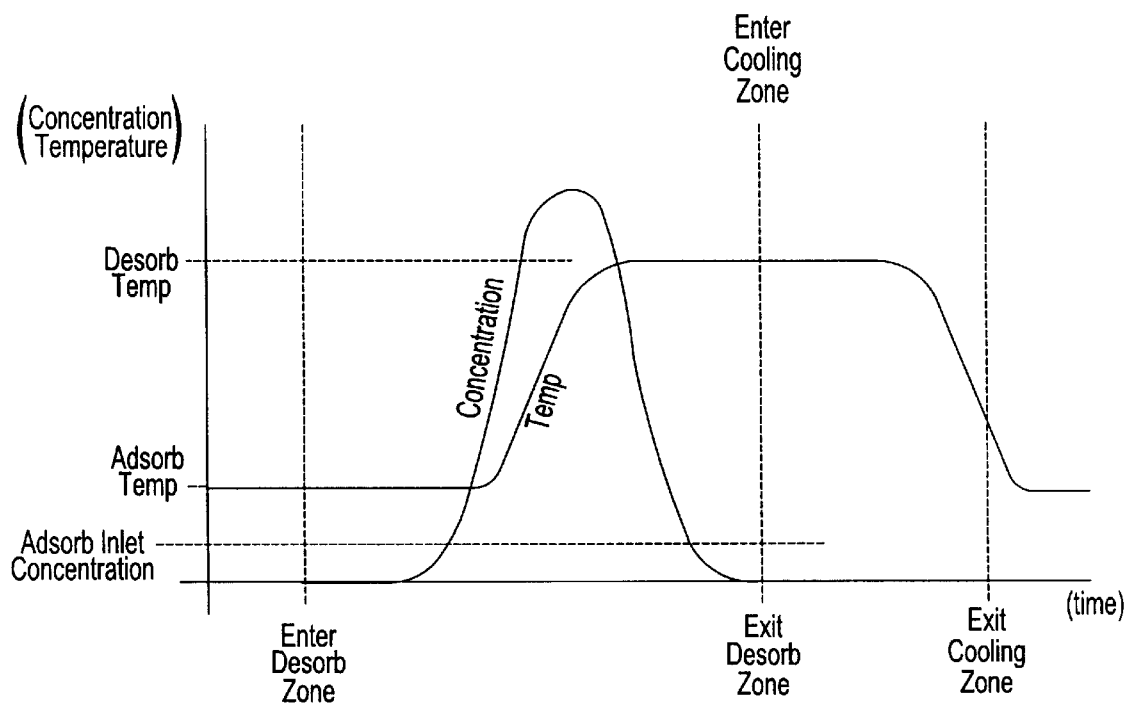
FIG. 2 is a graph of the temperature and concentration of pollutants in the desorbent zone shown in FIG. 1.

As described above, FIG. 1 illustrates one embodiment of a conventional rotary concentrator and FIG. 2 graphically illustrates the temperature and concentration of pollutants in the desorbent zone 24 as a typical segment rotates through the desorbent zone. As described above, all of the pollutants are removed from the desorbent zone 24 by passing a hot desorbent gas over the adsorbent media in the desorbent zone. The optional cooling zone 38 reduces the temperature of the adsorbent media received from the desorbent zone 24 because the adsorbent media will not adsorb pollutants at the desorbent temperature. Thus, pollutants are not removed in the optional cooling zone 38. The present invention takes advantage of the discovery that adsorbable pollutants can be removed from the media in the desorbent zone using a gas having a temperature substantially below the desorption temperature (e.g. ambient to 100° F.), provided the media is at or near the desorption temperature. This not only results in removal of the adsorbable pollutants, but also cools the media to the adsorption temperature. As described below in regard to the specific embodiments of this invention, it is also possible to utilize this invention in various ways to further improve the efficiency and cost of rotary concentrators.

Figure 3:
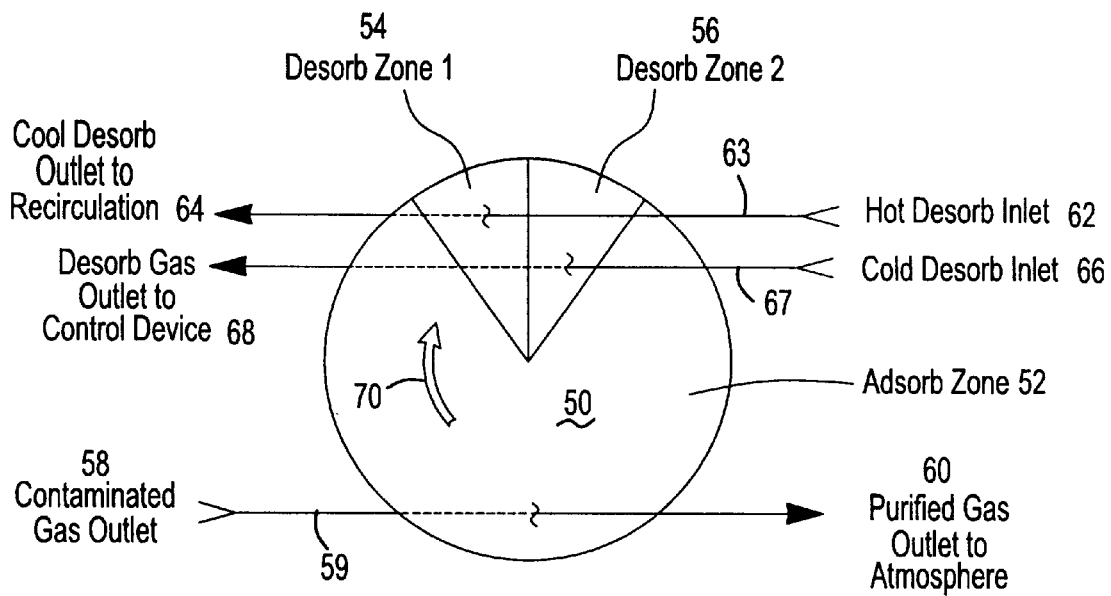
FIG. 3 is a schematic drawing illustrating a preferred embodiment of a rotary concentrator and method of this invention.

FIG. 3 illustrates the general construction and operation of the rotary concentrator and method of this invention. The rotary concentrator of this invention includes a rotary unit having adsorbent media 50 as described above. The rotary unit is enclosed within a housing having seals (not shown) which divide the adsorbent media into an adsorption zone 52, a first desorbent zone 54 and a second desorbent zone 56. Contaminated process gas having adsorbable pollutants is received from gas outlet 58 and directed over the media in the adsorption zone 52 as shown by arrow 59 and described above. The pollutants are then adsorbed by the media such that purified gas is received in outlet 60 where it may be vented to atmosphere as in a conventional rotary concentrator. Hot desorbent gas is simultaneously passed over the adsorption medium in the first desorbent zone 54 from inlet 62, heating the medium in the first desorbent zone to the desorption temperature of the medium as shown in FIG. 3. The gas received from the first desorbent zone 54 at outlet 64 is cooled as it heats the medium. The gas stream 63 is referred to herein as the first gas stream which has been heated to the desorption temperature of the medium. As stated above, the desorption temperature is generally between about 250° to 300° F. In a conventional rotary concentrator, as described above, the medium is maintained at the desorption temperature during the desorption phase. However, as described below, very little of the adsorbable pollutants are removed in the first desorbent zone 54 and therefore the gas received from the cooled desorbent outlet may be recirculated from the rotary concentrator.

Simultaneously, cooled desorbent air is received in the second desorbent zone 56 from inlet 66 as shown by arrow 67, which removes substantially all of the adsorbable pollutants and cools the adsorbent media. The gas received in the desorbent gas outlet 68 from the second desorbent zone 56 therefore contains substantially all of the adsorbed pollutants. The gas stream 67 received from the cold desorbent zone inlet 66 is sometimes referred to herein as the second desorbent gas stream and has a temperature below the desorption temperature of the media which results in the improved efficiencies of the rotary concentrator of this invention as described. The second gas stream received in the desorbent gas outlet is then circulated directly or indirectly to a control device which removes or destroys the pollutants, as described below, such as a regenerative thermal oxidizer or a catalytic oxidizer. Thus, as the media 50 rotates through the zones, as shown by arrow 70, the contaminated gas stream received from inlet 58 is passed over the adsorbent media in the adsorbent zone 52, removing the adsorbable pollutants and purifying the gas. As the media is received in the first desorbent zone 54, the media is heated by the first desorbent gas stream 63 to the desorption temperature. Then, as the media is received in the second desorbent zone, the cold desorbent gas stream 67 removes the pollutants which is recirculated to a control device.

Figure 4:
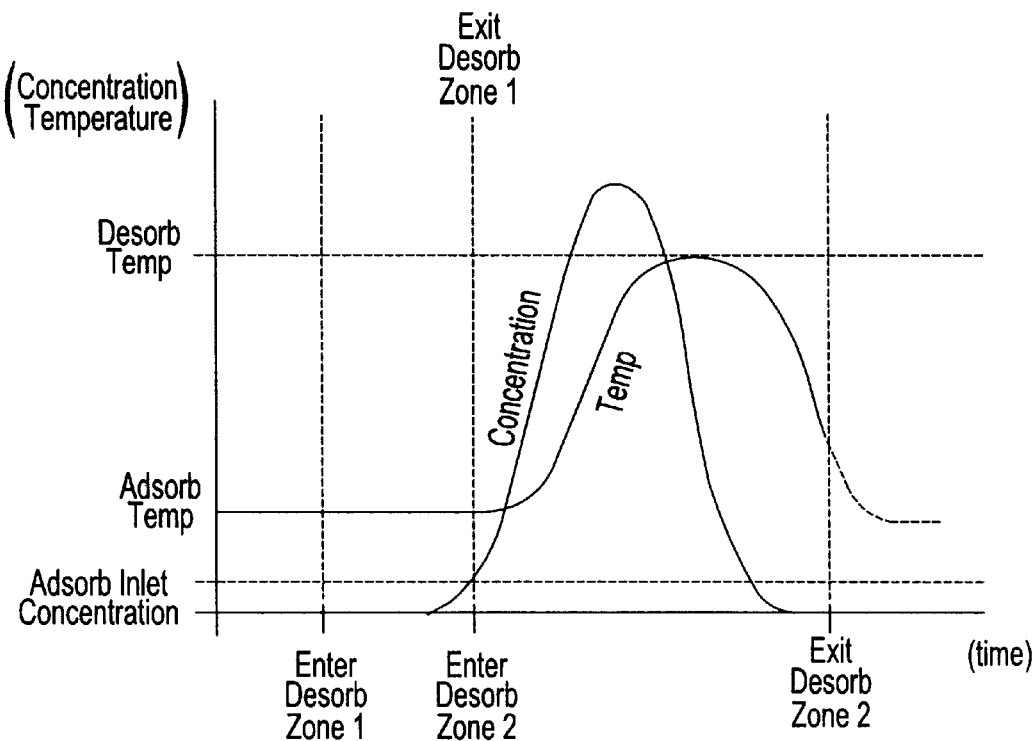
FIG. 4 is a graph similar to FIG. 2 illustrating the temperature and concentration of pollutants in the desorbent zones.

FIG. 4 illustrates the temperature and pollution concentration of the gases exiting a segment of the adsorbent media as it passes through the desorbent zones in the rotary concentrator of this invention. As illustrated, the desorbent outlet temperature is elevated to the same temperature as a conventional rotary concentrator system, but is not maintained at that temperature for as long. As shown in FIG. 4, substantially all of the pollutants are removed from the media in the second desorbent zone and the media is quickly cooled to the adsorption temperature for adsorption of pollutants in the adsorption zone 52. As set forth above, laboratory testing has shown that this method of removing pollutants, wherein the media is heated to the desorption temperature by the gas stream 63 and the pollutants are removed in the second desorbent zone 56 by cold gas stream is not detrimental to the thoroughness of desorption.

FIGS. 3 and 4 illustrate a split desorption zone wherein the desorbent zones 54 and 56 are approximately equal. The first desorbent zone is located "upstream" of the second desorbent zone as the media rotates through these zones as shown by arrow 70. That is, the inlet face of desorbent zone 54 is approximately the same as the outlet face. It is possible, however, for the faces of the two zones to be of unequal areas. In this case, some of the inlet gas from desorbent zone 1 could exit the adsorbent into the outlet face area of desorbent zone 2, or vice versa. Further, it is possible with the method of this invention to have only one desorbent zone, wherein the first gas stream is passed over the media in the combined desorbent zone having a temperature equal to or greater than the desorption temperature of the media, thereby heating the media. A second cold desorbent gas 67 is passed over the media in the desorbent zone, removing the pollutants. One method of accomplishing the method of this invention with a single desorbent zone would be to index the media through the desorbent zone, wherein the first gas stream heats the adsorbent media to the desorption temperature and the cool second gas stream removes the pollutants and cools the media. However, the preferred embodiment of the rotary concentrator of this invention includes two adjacent desorbent zones as shown in FIG. 3.

The method of this invention may be incorporated into various rotary concentrator systems to take advantage of the efficiencies of the improved method of this invention. FIGS. 5 to 9 illustrate several alternative embodiments of rotary concentrator systems all of which incorporate the improved rotary concentrator illustrated in FIGS. 3 and 4. As will be understood, however, there are numerous other systems which may be utilized to take advantage of the dual temperature desorption method of this invention. In each of the illustrated embodiments, the media 50 is divided by the housing and seals (not shown) into an adsorption zone 52, a first desorbent zone 54 and a second desorbent zone 56 and the media rotates through these zones as shown by arrow 70. Further, contaminated gas having adsorbable pollutants is received from an inlet 58 and the purified gas is received in an outlet 60 which may be vented to atmosphere. The first gas stream 63, which is received in the first desorbent zone 54, is heated to a temperature equal to or greater than the desorption temperature of the media 50 and the second cold gas stream 67 is preferably between about ambient and 100° F. The approximate relative volumetric gas flow rates are shown in parenthesis near each flow title. In a conventional rotary concentrator system, the volume of gas flow received from the desorbent zone through the control device, such as a thermal oxidizer, is 10% of the inlet gas flow having adsorbable pollutants.

Figure 5:
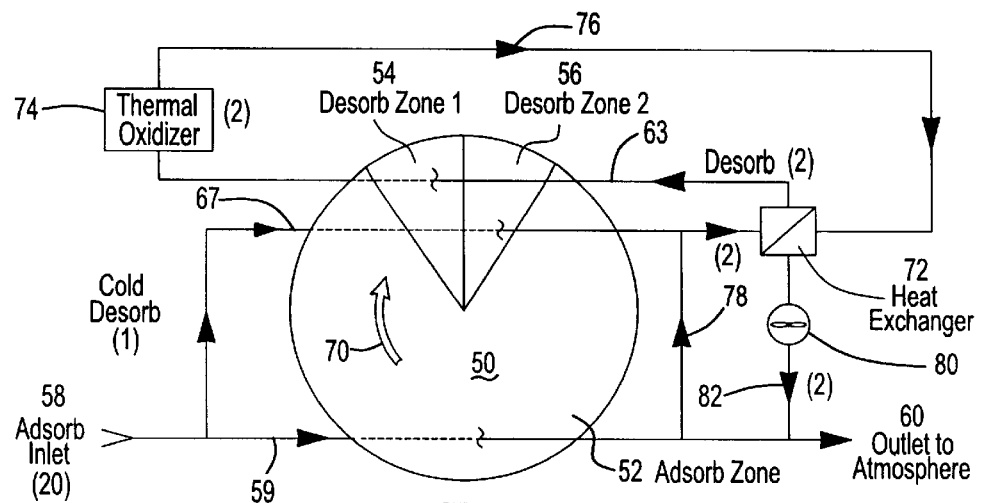
FIG. 5 is a schematic drawing illustrating one embodiment of the rotary concentrator system of this invention.

In FIG. 5, the inlet gas stream 59 including adsorbable pollutants is received from inlet 58, passed over the media in the adsorption zone 52 and circulated to outlet 60. A portion of the inlet gas stream (approximately 5% of the volume or 1/20 in the illustrated embodiment) is circulated as the second gas stream 67 through the second desorbent zone 56 to a heat exchanger 72, where the gas is heated to the desorption temperature and becomes the inlet gas stream 63 to the first desorbent zone 54. The cooled gas received from the first desorbent zone is then circulated to a thermal oxidizer 74 where the pollutants are destroyed and the gas is heated. The heated gas stream 76 from the thermal oxidizer is then circulated to the heat exchanger 72 which heats the first gas stream 63 as described. To maintain the appropriate volumetric flow, a portion of the purified gas received from the adsorbent zone 52 is circulated to the outlet stream from the second desorbent zone as shown by arrow 78. The purified gas received from the thermal oxidizer 74 is circulated through the heat exchanger 72 by fan 80 to the outlet 60 as shown by arrow 82. Thus, in the embodiment of the rotary concentrator system shown in FIG. 5, the second gas stream received from the second desorbent zone 56 is heated and recirculated to the first desorbent zone 54 as shown by arrow 63 indirectly to the oxidizer processor 74 and the volume of air received by the thermal oxidizer 74 is equal to a conventional rotary concentrator of about 10% as illustrated by the volumetric flow rates shown in parentheses.

Figure 6:
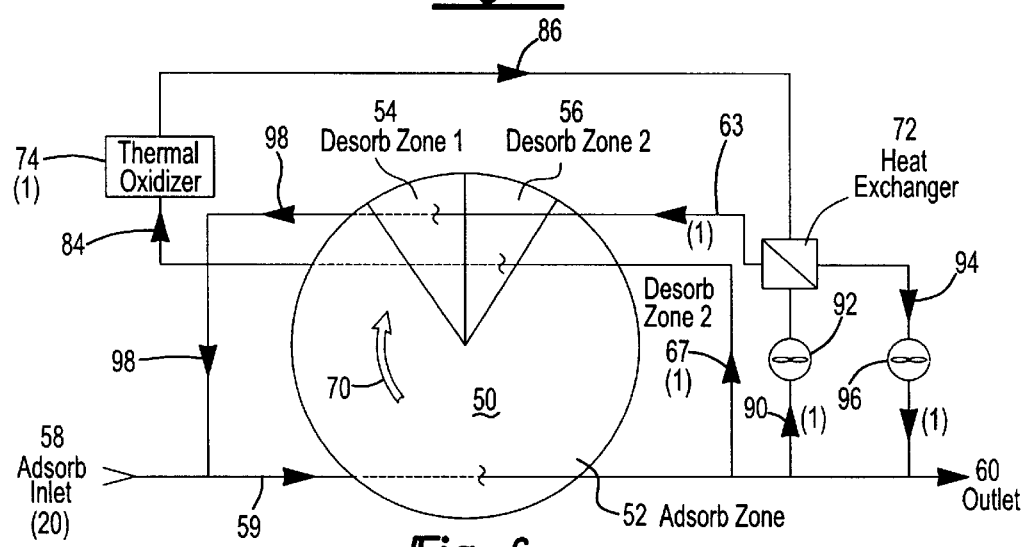
FIG. 6 is a schematic drawing of a second embodiment of the rotary concentrator of this invention.

In the embodiment shown in FIG. 6, the inlet gas stream 59 having adsorbable pollutants is received from the inlet 58 passed over the media in the adsorption zone 52 and the purified gas is circulated to the outlet 60 as described. A portion of the purified outlet stream (approximately 5% in the illustrated embodiment) is circulated to the cool second desorbent zone 56 as illustrated by arrow 67 where it removes the pollutants. The second gas stream is then circulated to the thermal oxidizer 74 as shown by arrow 84, where the pollutants are destroyed and the gas stream is heated and circulated to the heat exchanger 72 as shown by arrow 86. The purified gas stream 86 received from heat exchanger 72 as shown by arrow 94 is circulated by fan 96 to the outlet 60. A portion (approximately 5% in the disclosed embodiment) is circulated by fan 92 to the heat exchanger 72 as shown by arrow 90, where the as is heated and becomes the first gas stream 63 which is passed over the media in the first desorbent zone 54, heating the desorbent zone to the desorption temperature as described above. The outlet gas from the first desorbent zone 54 is then circulated to the inlet stream 59 as shown by arrows 98. As set forth above, only a very small portion of the pollutants are removed in the first desorbent zone 54 and therefore the circulation of the as from the first desorbent zone to the inlet gas stream 59 does not significantly add pollutants to the inlet gas stream 59. Thus, FIG. 6 illustrates the method of this invention incorporated into a system of similar configuration to traditional rotary concentrator systems. In this arrangement, the flow through the thermal oxidizer 74 is about 5% of the inlet gas stream 59. Also, the flow on the two sides of the heat exchanger are approximately equal, allowing for a cost effective heat exchanger design and a thermal oxidizer design with low energy consumption. The total system energy consumption for this system would be approximately one-half the energy consumption of a normal rotary concentrator. Also, the cost to constrict the system would be reduced because of the smaller thermal oxidizer and the smaller heat exchanger.

Figure 7:
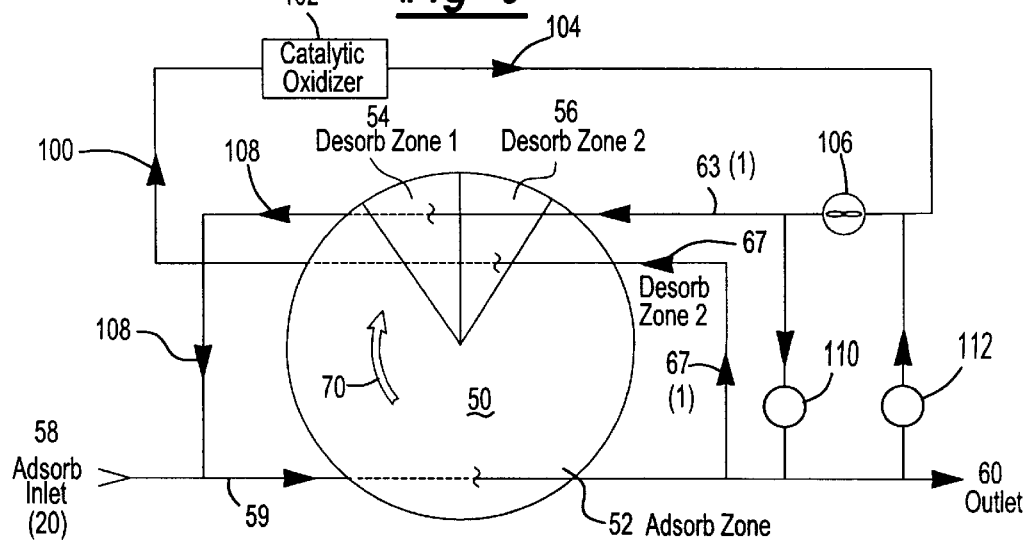
FIG. 7 is a schematic drawing of a third embodiment of the rotary concentrator and method of this invention.

In the embodiment of the rotary concentrator system shown in FIG. 7, the inlet gas stream 59 received from inlet 58 is passed over the adsorbent media in adsorption zone 52 and the purified gas is circulated to outlet 60 as described above. A portion of the purified gas (approximately 5% in the disclosed embodiment) is utilized as the second gas stream 67 and circulated over the adsorbent media in the second desorbent zone 56 as shown by arrow 67. The outlet gas stream shown by arrow 100 is circulated to a catalytic oxidizer 102 where the pollutants are oxidized and the gas is heated. The heated purified outlet gas stream 104 from the catalytic oxidizer 102 is then recirculated by fan 106 where a portion of the gas flow becomes the first gas stream 63 which flows over the media in the first desorbent zone 54 which is recirculated to the inlet gas stream 59 as shown by arrows 108. Dampers 110 and 112 permit the control of gas flow into and out of the gas stream 104 from the catalytic oxidizer 102 and the purified gas received from the adsorbent zone 52.

Figure 8:
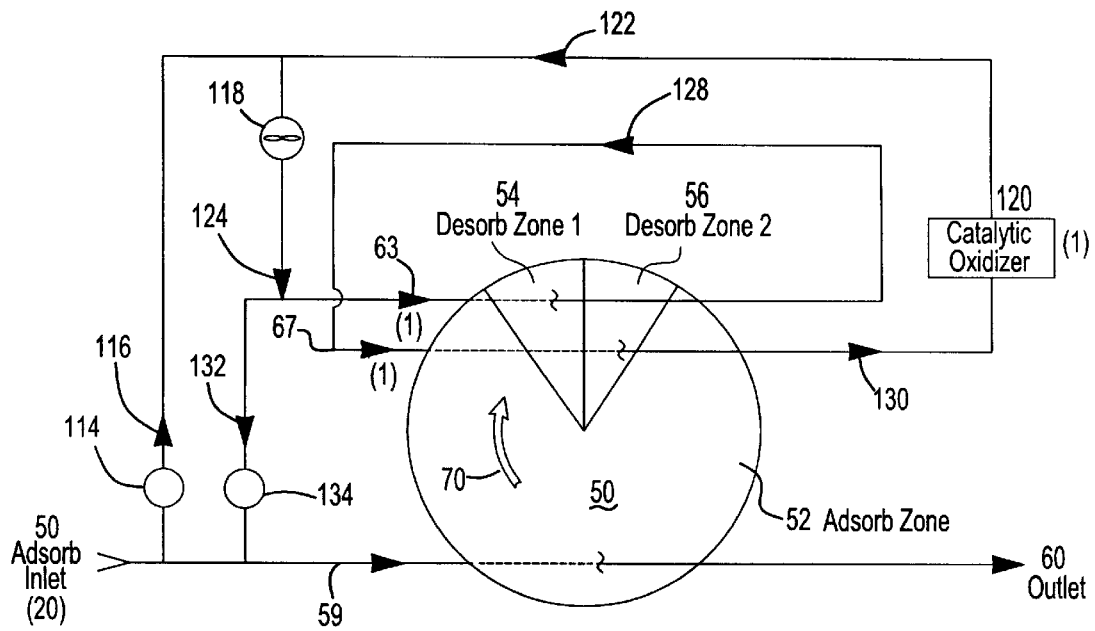
FIG. 8 is a schematic drawing of a fifth embodiment of the rotary concentrator and method of this invention.

FIG. 8 also discloses a direct heated system wherein the desorbent outlet air from desorbent zone 54 is recirculated to the inlet gas stream of the second desorbent zone 56. A portion of the inlet gas stream 59 received from the inlet 50 is circulated through damper 114 as shown by arrow 116. The inlet gas is then circulated by fan 118 and combined with heated purified gas received from the catalytic converter 120 as shown by arrow 122. The heated combined gas stream shown by arrow 124 is then circulated to the first desorbent zone 54 as the first gas stream 63 where it heats the media in the first desorbent zone as described above. The outlet gas from the first desorbent zone is then recirculated to the second desorbent zone as shown by arrow 128 and becomes the second gas stream 67. The outlet from the second desorbent zone is then circulated to the catalytic oxidizer 120 as shown by arrow 130. A portion of the inlet gas stream and the exit gas stream 122 is further recirculated to the inlet gas stream 59 as shown by arrow 132 through damper 134.

Figure 9:
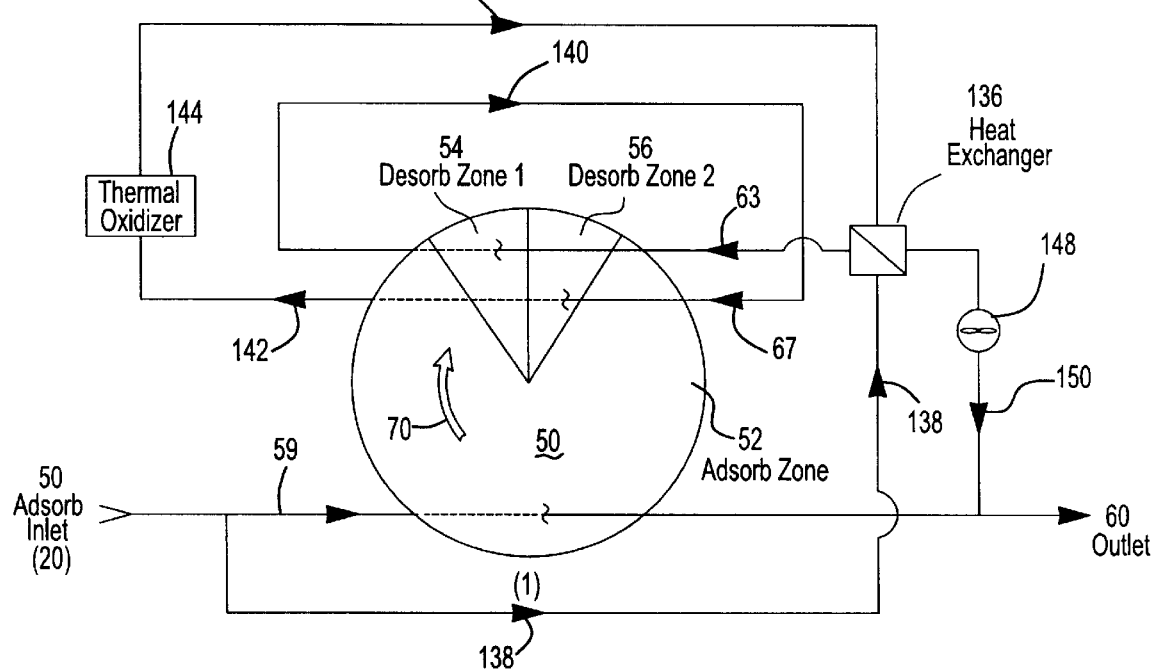
FIG. 9 is a sixth embodiment of the rotary concentrator and method of this invention.

Finally, in the embodiment shown in FIG. 9, a portion of the inlet gas stream 59 (approximately 5% in the disclosed embodiment) is circulated to heat exchanger 136 as shown by arrows 138. The heated gas stream 63 (which is the first gas stream) received from the heat exchanger 136 is passed over the media in the first desorbent zone 54 as described above. The exit gas from the first desorbent zone 54 shown by arrow 140 is recirculated to the second desorbent zone 56 where it becomes the second gas stream 67. The exit stream shown by arrow 142 from the second desorbent zone is circulated to the thermal oxidizer 144. The exit gas stream from the thermal oxidizer 144 shown by arrow 146 is then circulated to the heat exchanger 136 to heat the gas stream 138 as described above. The gas stream 146 from heat exchanger 136 is then circulated by fan 148 shown by arrow 150 to the outlet 60. It is anticipated that this embodiment may become a preferred embodiment because of the efficiencies of this system.

As will now be understood, the preferred embodiments of the rotary concentrator of this invention include a rotating unit including adsorbent media 50 having an adsorption zone 52, a first desorbent zone 54 and an adjacent second desorbent zone 56, wherein the first desorbent zone 54 is located upstream of the second desorbent zone 56 as the adsorbent media rotates through these zones as shown by arrow 70. A process gas inlet 50 directs an inlet gas stream 59 having adsorbable pollutants over the adsorbent media 50 in the adsorption zone 52. A hot desorbent gas inlet 63 directs hot desorbent gas having a temperature equal to or greater than the desorption temperature of the absorbable pollutants over the adsorbent media in the first desorbent zone 54 heating the media 50 to the desorption temperature of the media. A second cool desorbent gas inlet 67 directs desorbent gas having a temperature less than the desorption temperature over the media in the second desorbent zone 56, thereby removing the pollutants from the media in the second desorbent zone and cooling the media to the adsorption temperature of the media.

The rotary concentrator systems disclosed in FIGS. 5 to 9 are disclosed herein for illustration purposes only and various other embodiments of rotary concentrator systems may be utilized with the dual temperature desorption system of this invention. Further, various forms of control devices may be utilized to remove or destroy the pollutants received from the cold second desorbent zone 56 including conventional oxidizer processors such as thermal oxidizers and catalytic oxidizers. It should also be noted from the embodiments described that the flow through the desorbent zones 54 and 56 may be in the same or opposite directions and the inlet gas stream 63 to the first desorbent zone may be heated by a heat exchanger or a thermal or catalytic oxidizer. Although the most preferred embodiment of the rotary concentrator of this invention includes two adjacent desorbent zones as described above, the method of this invention may also be utilized with a single dual temperature desorbent zone. In each of the disposed embodiments of the rotary concentrators and method of this invention, the adsorbable pollutants are removed with greater efficiency than prior rotary adsorption systems. The higher energy efficiency is achieved by supplying desorption air at two temperatures and preferably in two stages combined with separately receiving and treating the desorption gas output.

What is claimed is:

1. A method for removing adsorbable pollutants from an inlet gas stream using a rotary concentrator having adsorbent media including an adsorption zone and at least one desorbent zone, said method comprising the following steps:

a rotating said adsorbent media;

passing said inlet gas stream including removable adsorbable pollutants over said media in an adsorbent zone, thereby removing said adsorbent pollutants;

passing a first gas stream having a temperature equal to or greater than a desorption temperature of adsorbable pollutants on said adsorbent media over said media in said desorbent zone for a time sufficient to heat said media in said desorbent zone to generally the desorption temperature of said adsorbable pollutants on said adsorbent media;

then passing a second gas having a temperature less than said desorption temperature of said adsorbent media over a said media in said desorbent zone to remove said adsorbable pollutants from said desorbent zone; and processing said gas containing said adsorbent pollutants received from said desorbent zone in a processor by destroying or removing said adsorbable pollutants.

2. The method of removing adsorbable pollutants from an inlet gas stream as defined in claim 1, wherein said at least one desorbent zone comprises two adjacent fixed desorbent zones including a first desorbent zone and a second adjacent desorbent zone, wherein said first desorbent zone is located upstream of said second desorbent zone as said adsorbent media rotates through said desorbent zones, said method including passing said first gas having a temperature equal to or greater than a desorption temperature over said adsorbent media in said first desorbent zone and passing said second gas having a temperature less said desorbent temperature over said adsorbent media in said second desorbent zone.

3. The method of removing adsorbable pollutants from an inlet gas stream as defined in claim 1, wherein said step of destroying or removing said adsorbable pollutants is further defined by heating and destroying said adsorbable pollutants and utilizing the heat generated by said processor to heat said first gas to a temperature equal to or greater than said desorbent temperature of said adsorbable pollutants.

4. The method of removing adsorbable pollutants from an inlet gas stream as defined in claim 1, wherein said method includes utilizing said inlet gas stream having a temperature less than said desorption temperature as said second gas.

5. The method of removing adsorbable pollutants from an inlet gas stream ad defined in claim 1, wherein said method includes passing said second gas received from said desorbent zone to said processor, oxidizing said adsorbable pollutants and heating said second gas to a temperature equal to or greater than said desorption temperature, then directing said second gas being heated to said desorbent zone and utilizing said second gas as said first gas.

6. The method of removing adsorbable pollutants from an inlet gas stream as defined in claim 1, wherein said method includes passing said second gas received from said desorbent zone to said processor, oxidizing said adsorbable pollutants and heating said gas, then directing said gas being heated to a heat exchanger, said heat exchanger transferring the heat to said first gas.

7. A method of removing adsorbable pollutants from an inlet gas stream using a rotary concentrator, said rotary concentrator including adsorbent media having an adsorbent zone, a first desorbent zone and a second adjacent desorbent zone, wherein said first desorbent zone is located upstream of said second desorbent zone as said media rotates through said zones, said method comprising the following steps:

rotating said adsorbent media through said zones;

passing said inlet gas stream including adsorbable pollutants over said adsorbent zone of said adsorbent media, thereby removing said adsorbable pollutants from said inlet gas stream;

passing a first gas having a temperature equal to or greater than a desorption temperature of said adsorbable pollutants on said adsorbent media over said media in said first desorbent zone for a time sufficient to heat said media in said first desorbent zone to generally the desorption temperature of said pollutants on said adsorbent media;

passing a second gas having a temperature less than said desorption temperature over said adsorbent media in said second desorbent zone to remove said adsorbable pollutants from said second desorbent zone; and passing said gas received from at least one of said desorbent zones to an oxidizer processor destroying said adsorbable pollutants.

8. A method of removing adsorbable pollutants from an inlet gas stream as defined in claim 7, wherein said method includes directing said second gas received from said second desorbent zone to said oxidizer processor, thereby destroying and removing said adsorbable pollutants.

9. The method of removing adsorbable pollutants from an inlet gas stream as defined in claim 7, wherein said oxidizer processor heats said second gas received from said second desorbent zone to a temperature equal to or greater than said desorption temperature, then utilizing the heat from said oxidizer processor to heat said first gas.

10. The method of removing adsorbable pollutants from an inlet gas stream as defined in claim 9, wherein said method includes directing said second heated gas from said oxidizer processor to said first desorbent zone.

11. The method of removing adsorbable pollutants from an inlet gas stream as defined in claim 9, wherein said method includes directing said second heated gas from said oxidizer processor to a heat exchanger and utilizing the heat from said heat exchanger to heat said first gas to said desorption temperature.

12. The method of removing adsorbable pollutants from an inlet gas stream as defined in claim 7, wherein said method includes directing a portion of said inlet gas stream having a temperature less than said desorption temperature to said media in said second desorbent zone.

13. The method of removing adsorbable pollutants from an inlet gas stream as defined in claim 7, wherein said method includes directing said first gas received from said first desorbent zone having a temperature less than said desorption temperature to said media in said second desorbent zone.

14. The method of removing adsorbable pollutants from an inlet gas stream as defined in claim 7, wherein said method includes directing said first gas received from said first desorbent zone to said inlet gas stream.

15. The method of removing adsorbable pollutants from an inlet gas stream as defined in claim 7, wherein said method includes directing a portion of said gas stream received from said oxidizer processor to said inlet gas stream.

16. A method of removing adsorbable pollutants from an inlet gas stream using a rotary concentrator, said rotary concentrator including adsorbent media having an adsorbent zone, a first desorbent zone and a second adjacent desorbent zone wherein said first desorbent zone is located upstream of second desorbent zone as said adsorbent media rotates through said zones, said method comprising the following steps:

rotating said adsorbent media through said zones;

passing said inlet gas stream including adsorbable pollutants over said media in said adsorbent zone, thereby removing said adsorbable pollutants;

passing a first gas having a temperature equal to or greater than a desorption temperature of said adsorbable pollutants on said adsorbent media over said media in said first desorbent zone for a time sufficient to heat said media in said first desorbent zone to generally said desorption temperature;

recycling said first gas received from said first desorbent zone to said rotary concentrator;

passing a second gas having a temperature less than said desorption temperature over said media in said second desorbent zone to remove said adsorbable pollutants from said media in said second desorbent zone;

directing said second gas received from said second desorbent zone to an oxidizer processor, thereby oxidizing said adsorbable pollutants and heating said second gas.

17. The method of removing adsorbable pollutants from an inlet gas stream as defined in claim 16, wherein said method includes directing a portion of said inlet gas stream having a temperature less than said desorption temperature to said media in said second desorbent zone.

18. The method of removing adsorbable pollutants from an inlet gas stream as defined in claim 16, wherein said method includes directing said first gas from said first desorbent zone to said inlet stream.

19. The method of removing adsorbable pollutants from an inlet gas stream as defined in claim 16, wherein said first gas received from said desorbent zone having a temperature less than said desorption temperature is recirculated to said second desorbent zone as said second gas.

20. The method of removing adsorbable pollutants from an inlet gas stream as defined in claim 16, wherein a position of said inlet as stream is directed to a heat exchanger receiving heated as from said oxidizer processor, thereby heating said inlet gas to a temperature equal to or greater than said desorption temperature, then directing said inlet as being heated to said first desorbent zone as said first gas.

21. A rotary concentrator comprising:

a rotating unit including adsorbent media having an adsorbent zone, a first desorbent zone and an adjacent second desorbent zone, wherein said first desorbent zone is located upstream of said adjacent second desorbent zone as said adsorbent media rotates through said zones;

a process gas inlet directing an inlet gas stream having adsorbable pollutants over said adsorbent media in said adsorbent zone;

a hot desorbent gas inlet directing hot desorbent gas having a temperature equal to or greater than a desorption temperature of said adsorbable pollutants over said adsorbent media in said first desorbent zone; and a second cold desorbent inlet directing desorbent gas having a temperature less than said desorption temperature over said media in said second desorbent zone, thereby removing said pollutants from said media in said second desorbent zone.

22. The rotary concentrator as defined in claim 21, wherein said rotary concentrator includes a first desorbent gas outlet receiving as from said first desorbent zone and recirculating said first desorbent gas to said rotary concentrator.

23. The rotary concentrator as defined in claim 21, wherein said rotating unit includes a second gas outlet receiving gas from said second desorbent zone and directing said gas to an oxidizer controller.

* * * * *